United States Patent

[11] 3,612,081

| [72] | Inventor | Jack L. Williams<br>El Paso, Tex. |
|---|---|---|
| [21] | Appl. No. | 64,273 |
| [22] | Filed | Aug. 17, 1970 |
| [45] | Patented | Oct. 12, 1971 |
| [73] | Assignee | Textron, Inc. |

[54] APPARATUS AND METHOD FOR MONITORING A FLUID PRESSURE SYSTEM
17 Claims, 2 Drawing Figs.

[52] U.S. Cl. .................................................. 137/12, 137/460, 137/498
[51] Int. Cl. .................................................. F16k 17/20
[50] Field of Search .................................................. 137/12, 460, 464, 498

[56] References Cited
UNITED STATES PATENTS

| 2,103,962 | 12/1937 | Wineman | 137/498 X |
| 2,160,766 | 5/1939 | Thomason | 137/460 |
| 2,871,876 | 2/1959 | Edmond | 137/464 |
| 3,481,362 | 12/1969 | Dollison | 137/460 |

*Primary Examiner*—Henry T. Klinksiek
*Attorney*—Nilsson, Robbins, Wills & Berliner ABSTRACT: First and second volume chambers are connected to the fluid pressure system being monitored. Fluid from the system can flow to the chambers, but the fluid flow from the first of the chambers back to the system is restricted. Should the pressure differential between the system and the first chamber reach a predetermined amount, the second chamber is isolated from the system for a given period of time. If during this period of time the pressure differential between the second chamber and the system reaches a predetermined value, a signal is produced which signal may be used to actuate a device, such as a valve or warning signal.

INVENTOR.
JACK L. WILLIAMS

INVENTOR.
JACK L. WILLIAMS

APPARATUS AND METHOD FOR MONITORING A FLUID PRESSURE SYSTEM

BACKGROUND

This invention relates generally to apparatus for and a method of monitoring fluid pressure systems, and in particular to such monitoring apparatus and methods that provide a signal to sound a warning or actuate a device or both should the pressure in the system change a predetermined amount during a given period of time.

This invention has utility wherever a fluid pressure system is employed. It has particular utility, however, for monitoring gas and oil pipelines to close valves, shut down compressors, and sound warning devices should the pipeline break. In the case of oil pipelines, it is important to isolate a break in the line as soon as possible to reduce to a minimum the oil that is spilled. In the case of gas lines, it is important to block off the section of the line in which the break occurs as soon as possible, so that should the gas escaping from the line ignite, the resulting fire will be supplied with a diminishing source of fuel.

Heretofore, monitoring apparatus for fluid pressure systems where rate of change of pressure is being monitored have located an orifice between a volume chamber and the pipeline to restrict the flow of fluid from the volume chamber back to the pipeline, when the pressure in the line decreases. When the pressure in the pipeline dropped, the pressure in the volume chamber also dropped, but not at the same rate due to the orifice. This produced a pressure differential between the pressure chamber and the pipeline that was a function of the amount of the pressure drop, the time period over which it occurred, and the size of the orifice. This required that the orifice size be carefully selected to produce a pressure differential sufficient to actuate the monitoring apparatus when the pressure drop was due to a break in the line, but not when the pressure drop was due to normal fluctuations in line pressure. In some prior art instances spring loaded cylinders with reservoirs and check valves have been used to sense a decrease in pressure and operate to close a valve without any reference to time or rate of change of pressure. Examples of such prior art apparatus are shown in U.S. Pat. Nos. 2,160,776; 2,871,876 and 3,481,362.

SUMMARY

It is an object of this invention to provide apparatus for and a method of monitoring a fluid pressure system that is actuated when the difference between the system pressure and a fixed pressure reaches a predetermined amount within a predetermined time period.

It is another object of this invention to provide apparatus for and a method of monitoring a fluid pressure system that does not use an orifice between the system and a pressure chamber to provide the pressure differential therebetween that causes the apparatus to produce the signal for actuating a device, such as a valve in a pipeline.

It is another object of this invention to provide apparatus for and a method of monitoring a fluid pressure system that is initiated by a first change in system pressure of a predetermined magnitude and, when said first change occurs, compares system pressure to a constant pressure for a given period of time to determine whether a second pressure change of a predetermined magnitude occurs within said given time period before a device actuating signal is provided.

It is another object of this invention to provide apparatus for and a method of monitoring a fluid pressure system that uses the pressure differential between system pressure and a constant pressure to actuate a device, such as a valve, when the pressure of the system changes a given amount in a predetermined period of time.

It is another object of this invention to provide apparatus for and a method of monitoring a fluid pressure system wherein a pressure chamber that is normally attached in fluid communication with the system is isolated from the system when the pressure of the system changes a predetermined amount to provide a constant pressure for comparison with the pressure in the system to determine if the pressure in the system will change a predetermined amount during a given period of time thereby indicating a break or other problem.

It is another object of this invention to provide an apparatus for and method of monitoring a fluid pressure system that is initially actuated by a first differential pressure which apparatus provides a warning or valve operating signal, after being initially actuated, if a second pressure differential is reached within a given period of time and which apparatus returns to its original condition if the second pressure differential is not reached within said given time period.

The invention will now be described in detail in connection with the attached drawing wherein the apparatus is shown as monitoring the pressure of a gas pipeline to actuate a valve should the pressure in the line drop sufficiently during a given period of time to indicate a break in the line.

DETAILED DESCRIPTION

Figure 1:
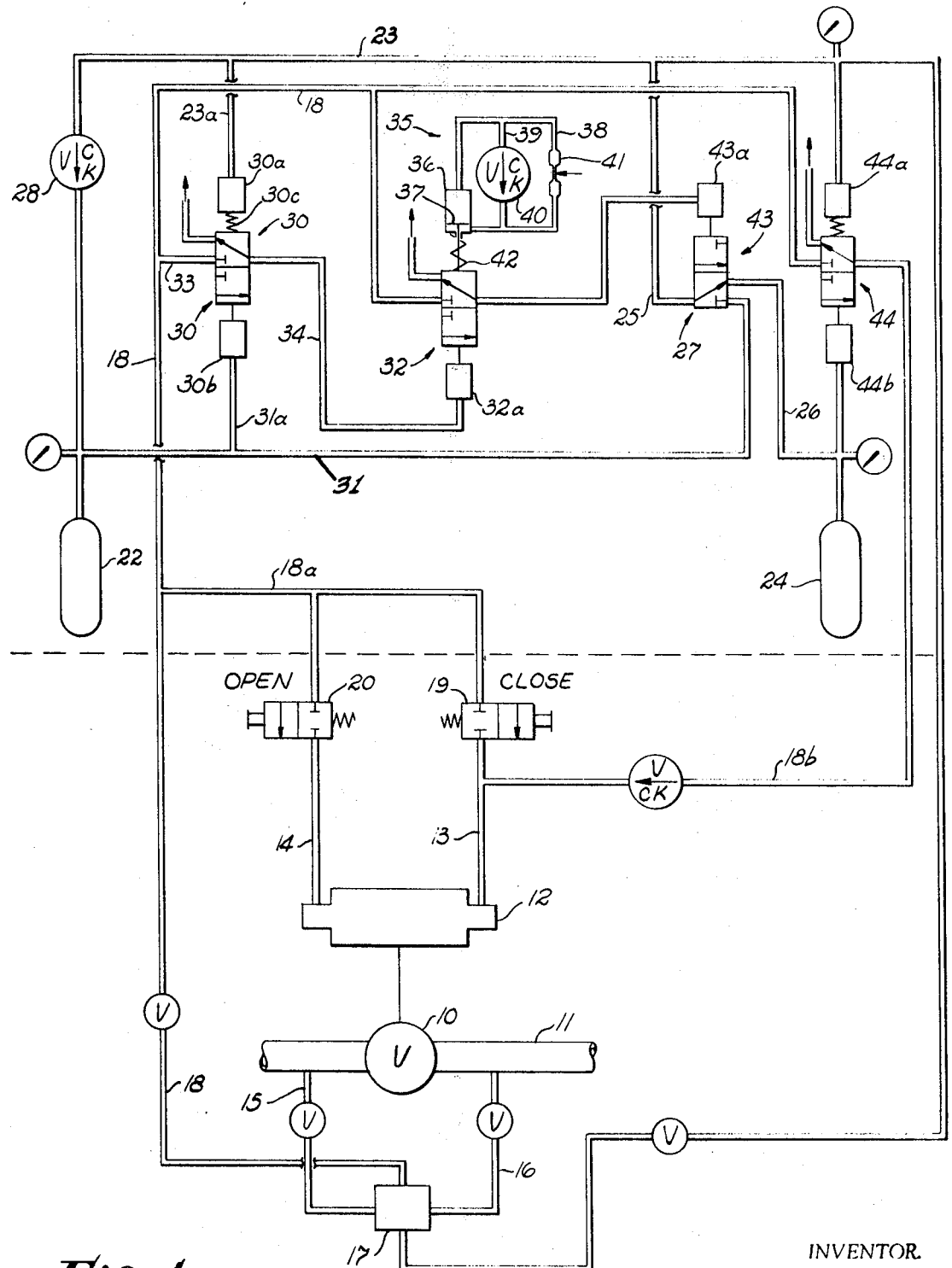
FIG. 1 is a schematic diagram of one embodiment of the apparatus of this invention in its quiescent condition.

As stated above, the apparatus in the drawings will be described in connection with actuating a valve in a gas pipeline responsive to a pressure drop as would result from a line break. The apparatus and method of this invention can be used to actuate or control other things, such as compressors, or to simply sound a warning that the pressure in the system has changed a predetermined amount in a given period of time.

In FIG. 1, a valve 10 is positioned in a pipeline 11. Valve actuator 12, when supplied with fluid under pressure, opens or closes the valve 10. Fluid pressure to the actuator 12 through the line 13 closes the valve; whereas the actuator 12 opens the valve 10 when it is supplied with fluid under pressure through the line 14.

The fluid under pressure for operating the actuator 12 is obtained from the pipeline 11. As shown, lines 15 and 16 are connected into pipeline 11 on opposite sides of valve 10. Both lines are connected into high pressure selector valve 17. This valve is arranged to allow the portion of the line having the higher pressure to be connected to lines 13 and 14 through lines 18 and 18a. In other words, when the valve 10 is closed, the pressure on opposite sides of the valve may not be equal. In fact, if the line on one side is broken, the pressure on that side may reach atmospheric pressure. High pressure selector valve 17 connects the valve actuator 12 to the side having the higher pressure and closes off the other side to make sure that fluid having the higher available pressure is available to operate the valve actuator 12. Manually operated valves 19 and 20 are located in lines 13 and 14, respectively, to allow manual operation of valve actuator 12 where desired.

In accordance with this invention, first means are connected to receive system pressure and operate to establish a first reference pressure for detecting a first change in system pressure of a predetermined magnitude. In the embodiment shown, first volume chamber 22 is connected to pipeline 11 through line 23, high pressure selector valve 17, and lines 15 and 16. Means are provided for causing the pressure of the fluid received in the first volume chamber 22 to follow the pressure of the system with the pressure of the fluid in the first volume chamber 22 lagging behind system pressure changes in one direction such that changes in system pressure in said one direction will cause a first pressure differential between the system and said first volume chamber 22. In the embodiment shown, such means comprises check valve 28, which allows fluid to flow into the first chamber 22, but which restricts the flow of the fluid out of the first chamber 22 back to the line 23. Thus, the first volume chamber 22 comprises means for establishing a first reference pressure, which, as will be explained below, will be substantially the extreme of system pressure that exists immediately prior to the detection of the first change in system pressure of said predetermined amount.

To detect the first pressure differential, comparator means are connected between said first reference pressure establishing means and system pressure to be actuated by a pressure change between the first reference pressure and system pressure of a predetermined amount. In the embodiment shown, differential pressure valve 30 is connected between line 23 and line 31. Any type of valve actuated by pressure differences can be used. The valve shown schematically in the drawings has actuating or power cylinder 30a connected to line 23 and power cylinder 30b connected to line 31 by line 31a. When the pressures in the power cylinders are substantially equal, spring 30c holds the valve in the position shown in FIG. 1. Should pipeline pressure drop, however, the pressure in power cylinder 30a drops while the pressure in power cylinder 30b remains constant because check valve 28 closes. When a predetermined pressure differential is reached, valve 30 changes its position to that shown in FIG. 2. The pressure differential required to accomplish this should be such that normal fluctuations in pipeline pressure will not inadvertently trigger the monitoring apparatus. Thus, the pressure differential required to actuate differential pressure valve 30 depends on the size of the line and the circumstances and conditions under which the line operates.

In accordance with this invention, time delay means are provided to be actuated when system pressure changes by said first predetermined amount, for example, a pressure drop of 8 p.s.i. in the pipeline initiates the monitoring apparatus. When the pressure in line 23, which is at the higher pipeline 11 pressure, drops 8 pounds below the pressure in first volume chamber 22, differential pressure valve 30 moves to the position shown in FIG. 2 and connects line 18 to power cylinder 32a of timer valve 32 through lines 33 and 34. Timer valve 32 includes timer means 35 for holding the valve in a given position for a time. It consists of cylinder 36 in which piston 37 is located. The cylinder is connected into a closed hydraulic system comprising loop 38 and branch 39. Piston 37 can freely move upwardly and displace fluid in the loop through check valve 40. It can move downwardly, however, only as fast as fluid can be forced through orifice 41. Thus, the size of the orifice and the force exerted by spring 42 determined the length of time valve 32 is open.

Second means are provided to receive system pressure for detecting a second change therein of a second predetermined magnitude within a given time period. In the embodiment shown, said second means includes second volume chamber 24 which is connected to pipeline 11 through lines 23, 25, control valve 27 and line 26. In the position shown in FIG. 1, control valve 27 is interconnecting lines 25 and 26 so that fluid can freely flow from pipeline 11 and line 23 into and out of second volume chamber 24. When timer valve 32 is opened by pressure from line 18 and the timer means 35 is actuated, line 18 is connected to power cylinder 43a of control valve 43 to actuate it and cause it to move to the position shown in FIG. 2. This control valve 43, as explained above, when in its normal (quiescent) position connects second volume chamber 24 to line 23 and maintains the chamber at the higher pipeline pressure. When actuated by fluid under pressure from line 18, however, the control valve 43 isolates second volume chamber 24 from line 23. Thus the fluid trapped in the second volume chamber 24 by such isolation remains at the pressure extant in the system when control valve 43 was actuated, thus establishing a second reference pressure for comparing to system pressure.

Control valve 43 upon being actuated also connects first volume chamber 22 directly to the line 23 thereby to allow chamber 22 to return again to the then existing pipeline pressure. Thus, means are provided to bypass the flow restricting means of the first reference pressure establishing means, i.e., check valve 28 in the embodiment shown, to connect first volume chamber 22 to the system.

In accordance with this invention, said second means also includes second comparator means which are connected between the second reference pressure establishing means and system pressure to detect a differential between the second reference pressure and the system pressure and to provide a device actuating signal should said pressure differential reach a predetermined magnitude during the time period provided by the time delay means. In the embodiment shown, such means comprise means that are responsive to a pressure differential between the pressure of the fluid in the second volume chamber and the pressure of the fluid in the system.

Thus, as shown in the drawings, differential pressure valve 44 which may be of the same type as valve 30 has its power cylinder 44a connected to line 23, which is at pipeline pressure, and its power cylinder 44b connected to second volume chamber 24.

Figure 2:
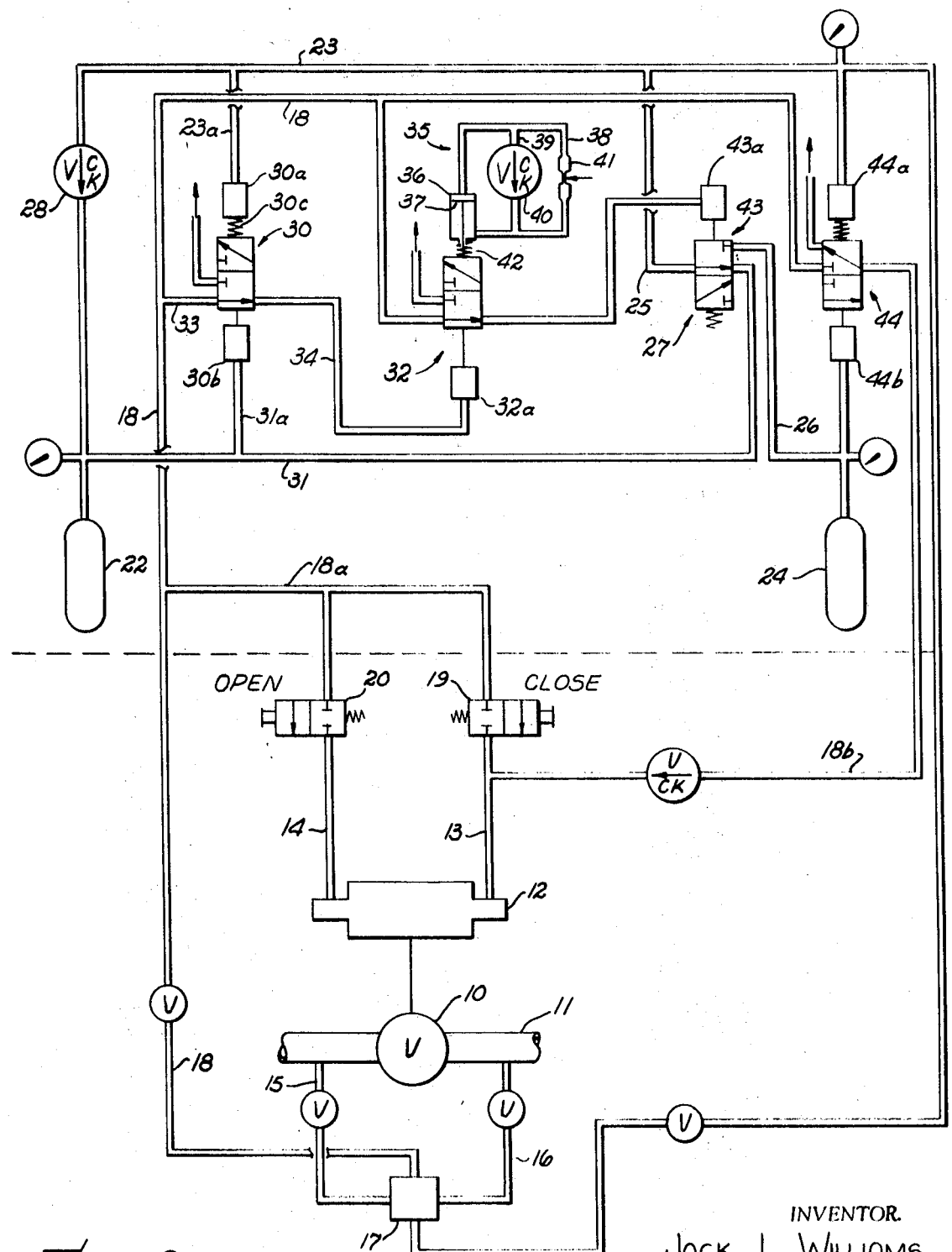
FIG. 2 is a schematic diagram similar to FIG. 1 showing the apparatus when the pressure in the pipeline has changed sufficiently to cause the apparatus to begin to compare the pressure in the system with a constant pressure.

In operation, when control valve 27 is actuated and moved to the position shown in FIG. 2, the pressure in second volume chamber 24 thereafter remains unchanged until valve 27 returns to the position shown in FIG. 1. If the pressure in the pipeline continues to decrease such that the pressure differential between line 23 and second volume chamber 24 reaches a predetermined value, before timer valve 32 returns the system to its original state, differential pressure valve 44 is actuated by power cylinder 44b and connects line 18 to the valve closing side of valve actuator 12 through line 18b. Such operation of the differential pressure valve 44 provides a signal which is sufficient to actuate any desired device, for example to close valve 10.

Should the timer valve 32 return to its normal position, such as shown in FIG. 1, before the pressure differential between second volume chamber 24 and line 23 is such as to actuate differential pressure valve 44, then the system will be returned to the condition shown in FIG. 1. Second volume chamber 24 again returns to pipeline pressure and the apparatus awaits again a pressure change in the pipeline sufficient to start it through the monitoring cycle as above described.

As can be seen from the above description, the operation of the apparatus is initiated by a first change in pressure of predetermined magnitude in the pipeline. The apparatus then compares system pressure with a reference pressure for a predetermined period of time. If, during that time, the system pressure falls below a predetermined amount, then the valve 10 is activated to block the line 11. If the pressure does not fall below the predetermined amount, then the pressure decline is attributable to something other than a line break and the apparatus does not activate the valve 10.

In the embodiment just described, the pressure in the first volume chamber 22 cannot be decreased except by actuating control valve 43 when the pressure differential between the chamber and the pipeline reaches the preselected amount required to actuate valve 30. Should there be a gradual decline in pipeline pressure for some reason other than a break in the line, the monitoring apparatus will be actuated periodically to keep the pressure in chamber 22 in line with pipeline pressure.

What is claimed is:

1. Apparatus for detecting pressure variations in a fluid handling system comprising:
   a. First means connected to receive system pressure for detecting a first change therein of a first predetermined magnitude;
   b. Time delay means connected to said first means for providing an elapsed time period of predetermined duration and operative responsive to said first means detecting said first change in system pressure; and
   c. Second means connected to receive system pressure for detecting a second change therein of a second predetermined magnitude, said second means being operable only during said elapsed time period.

2. Apparatus as defined in claim 1 wherein said first means includes first reference pressure establishing means and first comparator means connected between said first reference pressure establishing means and system pressure and operative to detect a differential between a first reference pressure and system pressure equal to said first predetermined magnitude.

3. Apparatus as defined in claim 2 wherein said first reference pressure establishing means includes unidirectional flow means connected to system pressure for establishing said first reference pressure as substantially equal to that extreme of system pressure existing immediately prior to detection of said differential of said first predetermined magnitude.

4. Apparatus as defined in claim 3 which further includes bypassing means connected between system pressure and said first reference pressure establishing means, said bypassing means being operative responsive to detection of said differential of said first predetermined magnitude for connecting said first reference pressure establishing means directly to system pressure.

5. Apparatus as defined in claim 4 wherein said bypassing means is operative only during said elapsed time period.

6. Apparatus as defined in claim 1 wherein said second means includes second reference pressure establishing means and second comparator means connected between said second reference pressure establishing means and system pressure and operative to detect a differential between a second reference pressure and system pressure equal to said second predetermined magnitude.

7. Apparatus as defined in claim 6 wherein said second reference pressure establishing means includes isolating means connected to system pressure and operative responsive to detection of said differential of said first predetermined magnitude for disconnecting said second reference pressure establishing means from system pressure for establishing said second reference pressure as substantially equal to that system pressure existing upon detection of said differential of said first predetermined magnitude.

8. Pressure system monitoring apparatus to provide a control signal to actuate a device, such as a valve, when the pressure in the system changes a given amount in a predetermined period of time, said apparatus comprising:
   a. First and second volume chambers;
   b. Means for causing the pressure of the chambers to follow system pressure with the pressure of the first chamber lagging behind system pressure such that changes in system pressure will cause a pressure differential between the system and the first chamber;
   c. Means responsive to a predetermined pressure differential between the pressure in the first chamber and the system to isolate the second chamber from the system to stabilize the pressure in the second chamber for a predetermined period of time; and
   d. Means responsive to a pressure differential between the pressure of the fluid in the second chamber and the pressure of the fluid in the system for sending a device actuating signal should such pressure differential reach a predetermined amount within said predetermined time interval.

9. Apparatus as defined in claim 8 in which the means for causing the pressure of the chambers to follow system pressure includes means providing fluid communication between the chambers and the system, including means restricting the flow of fluid from the first chamber to the system, and in which said means for isolating the second chamber from the system includes valve means connecting the second chamber to the system and means responsive to the pressure differential between the first chamber and the system to actuate the valve means and close communication between the second chamber and the system when the pressure differential between the first chamber and the system reaches a predetermined amount.

10. Apparatus as defined in claim 9 in which said means for isolating the second chamber from the system pressure further includes means for connecting the first chamber directly to the system and bypassing the fluid flow restricting means to equalize the pressure in the first chamber and the system while the second chamber is out of fluid communication with the system.

11. Pressure system monitoring apparatus to provide a control signal to actuate a device, such as a valve, when the pressure in the system changes a given amount during a given time period, said apparatus comprising:
   a. First and second volume chambers;
   b. Valve means permitting fluid flow from the system to the first chamber and restricting fluid flow from the chamber to the system;
   c. A time controlled valve;
   d. First differential pressure valve means, responsive to a differential between system pressure in the first chamber, to actuate the time controlled valve when a preselected pressure differential exists between the system and the first chamber;
   e. A control valve actuated by the timer valve to connect the first chamber to the system and to isolate the second chamber from the system for the period of time the timer valve is actuated; and
   f. Second differential pressure valve means to provide a signal to actuate a device if the pressure differential between the system and the second chamber reaches a predetermined amount within the time period that the time controlled valve is actuated.

12. A method of supplying a signal to actuate a device, such as a valve or warning device, should the pressure of a fluid in a system change a predetermined amount during a given time period, said method comprising:
   a. Connecting first and second volume chambers to the system to permit fluid from the system to flow into the chambers;
   b. Restricting the flow of fluid from the first chamber back to the system;
   c. Isolating the second chamber from the system for a given period of time should the pressure differential between the system and the first chamber reach a predetermined amount; and
   d. Providing a device actuating signal should the pressure differential between the second chamber and the system reach a predetermined amount during said time period.

13. The method of claim 12 with the further step of connecting the first chamber with the system when the second chamber is isolated from the system to permit the pressure of the fluid in the first chamber to equalize with system pressure.

14. Apparatus providing a control signal to actuate a device, such as a valve, when the pressure in a pipeline changes a given amount in a predetermined period of time, said apparatus comprising:
   a. First and second volume chambers;
   b. Means providing fluid communication between the chambers and the pipeline;
   c. Means responsive to a predetermined pressure change between the pressure in the first chamber and the pipeline for closing fluid communication between the second chamber and the pipeline for a predetermined period of time; and
   d. Means responsive to a pressure differential between the pressure of the fluid in the second chamber and the pressure of the fluid in the pipeline for sending a device actuating signal should such pressure differential reach a predetermined amount within said predetermined time interval.

15. The apparatus of claim 14 in which the means providing fluid communication between the chambers and the pipeline includes means restricting the flow of fluid from the first chamber to the pipeline, and in which said means for closing fluid communication between the second chamber and the pipeline include valve means connecting the second chamber to the pipeline and means responsive to the pressure differential between the first chamber and the pipeline to actuate the valve means and close communication between the second chamber and the pipeline when the pressure differential between the first chamber and the pipeline reaches a predetermined amount.

16. The apparatus of claim 15 in which said means for closing communication between the second chamber and the pipeline further includes means for connecting the first chamber directly to the pipeline and bypassing the fluid flow restricting means to equalize the pressure in the first chamber and the pipeline while the second chamber is out of fluid communication with the pipeline.

17. Pipeline break detecting apparatus for closing a valve or valves to stop the flow of fluid in a pipeline should the pressure in the pipeline drop a preselected amount during a given time period, said apparatus comprising:
   a. First and second volume chambers;
   b. Means connecting the chambers to a pipeline to allow the fluid in the pipeline to flow freely into the chambers and to restrict the flow of fluid from the first chamber to the pipeline sufficiently for the pressure of the fluid in the first chamber to require a period of time to equalize with the pressure of the fluid in the pipeline when pipeline pressure drops;
   c. Means responsive to a preselected pressure differential between the pressure of the fluid in the first chamber and the pressure of the fluid in the pipeline for closing fluid communication between the pipeline and the second chamber for a preselected period of time; and
   d. Means for sending a signal to operate a valve or valves to stop flow in a pipeline if the pressure differential between the pipeline and the second chamber reaches a preselected amount during said preselected period of time.

UNITED STATES PATENT OFFICE
CERTIFICATE OF CORRECTION

Patent No. 3,612,081  Dated October 12, 1971

Inventor(s) Jack L. Williams

It is certified that error appears in the above-identified patent and that said Letters Patent are hereby corrected as shown below:

Column 1, line 43, "2,160,776" should read -- 2,160,766 --.

Signed and sealed this 29th day of August 1972.

(SEAL)
Attest:

EDWARD M. FLETCHER, JR.                ROBERT GOTTSCHALK
Attesting Officer                      Commissioner of Patents